(12) United States Patent
Yasuda et al.

(10) Patent No.: US 9,746,102 B2
(45) Date of Patent: Aug. 29, 2017

(54) FLUID CONTROL VALVE

(71) Applicant: HORIBA STEC, Co., Ltd., Kyoto-shi, Kyoto (JP)

(72) Inventors: Tadahiro Yasuda, Kyoto (JP); Shigeyuki Hayashi, Kyoto (JP); Nobuyuki Kannan, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 126 days.

(21) Appl. No.: 14/226,167

(22) Filed: Mar. 26, 2014

(65) Prior Publication Data

US 2014/0290778 A1 Oct. 2, 2014

(30) Foreign Application Priority Data

Mar. 27, 2013 (JP) .................................. 2013-067266

(51) Int. Cl.
*F16K 41/10* (2006.01)
*F16K 31/00* (2006.01)

(52) U.S. Cl.
CPC ............ *F16K 41/10* (2013.01); *F16K 31/007* (2013.01); *Y10T 137/7895* (2015.04)

(58) Field of Classification Search
CPC ...... F16K 31/007; F16K 41/103; F16K 41/10; F16K 41/12; Y10T 137/7895
(Continued)

(56) References Cited

U.S. PATENT DOCUMENTS 393,536 A * 11/1888 Brudin .................... F16K 21/04
  251/241
2,888,037 A * 5/1959 Jones ...................... F16K 31/08
  137/512.1
(Continued)

FOREIGN PATENT DOCUMENTS

CN 2151329 Y 12/1993
DE 949204 C 9/1956
(Continued)

OTHER PUBLICATIONS

Japan Patent Office, Office Action Issued in Application No. 2013-067266, Nov. 11, 2016, 4 pages.
(Continued)

*Primary Examiner* — Marina Tietjen
(74) *Attorney, Agent, or Firm* — Alleman Hall Creasman & Tuttle LLP (57) ABSTRACT

In order to make it possible to increase a diameter and output thereof, a diaphragm structure is provided that has low repulsiveness, can be largely deformed to increase a stroke even without being applied with a large force from an actuator, and is unlikely to give rise to a defect or fault even when formed thin, and a fluid control valve is provided with the diaphragm structure and the actuator that presses the diaphragm structure, wherein the diaphragm structure is provided with: a protruding part that is formed in a tubular shape and pressed by the actuator; a brim part that spreads from a base end of the protruding part outward with respect to the protruding part; and a support part that is formed on an outer circumference of the brim part and attached to another member, and the brim part is formed in a film shape.

7 Claims, 11 Drawing Sheets

(58) Field of Classification Search
USPC ..... 251/335.1–335.3, 61–61.5, 331; 137/859
See application file for complete search history.

(56) References Cited

U.S. PATENT DOCUMENTS

| | | | | |
|---|---|---|---|---|
| 3,104,089 | A | | 9/1963 | Seltsam |
| 4,280,680 | A | * | 7/1981 | Payne ................. F16K 1/34 251/120 |
| 5,546,987 | A | * | 8/1996 | Sule .................. F16K 31/0658 137/625.5 |
| 2006/0151737 | A1 | * | 7/2006 | Newberg .............. F16K 27/07 251/335.2 |

FOREIGN PATENT DOCUMENTS

| | | | | |
|---|---|---|---|---|
| GB | 2107827 | A | * 5/1983 | ............ F16K 41/10 |
| JP | S3815275 | U | | 7/1963 |
| JP | S5478524 | A | | 6/1979 |
| JP | 2001027333 | A | | 1/2001 |
| JP | 2004003579 | A | | 1/2004 |
| JP | 2008133928 | A | | 6/2008 |
| JP | 2009209973 | A | | 9/2009 |
| JP | 2010190452 | A | | 9/2010 |

OTHER PUBLICATIONS

The State Intellectual Property Office of the People's Republic of China, First Office Action and Search Report Issued in Chinese Patent Application No. 201410085007.1, dated Apr. 1, 2017, 9 pages. (Submitted with Partial English Translation of First Office Action and Seach Report).

* cited by examiner

Note: Double-dashed chain line indicates boundary of region welded to flange part 43, but does not indicate actual line.

FLUID CONTROL VALVE

TECHNICAL FIELD

The present invention relates to a fluid control valve used for a device such as a mass flow controller that controls a gas flow rate or the like.

BACKGROUND ART

A fluid control valve is one that intervenes between an upstream side flow path and a downstream side flow path, to control a flow rate or pressure of fluid flowing through the flow paths, or to close so as to prevent the fluid from flowing between the flow paths. For example, a normal close type fluid control valve has a diaphragm structure that separates a flow path and the outside from each other in the fluid control valve, and is configured to control a flow rate or pressure of fluid in such a way that an actuator arranged on the outside changes, of a valve seat member and a valve element member arranged on the flow path side, a position of the valve element member through the diaphragm structure.

More specifically, the diaphragm structure is configured to include: a thin film part; and a pin that is welded and protruded toward the flow path side in a direction normal to the thin film part and in abutting contact with the valve element member. Further, the actuator presses the pin from the outside to thereby elastically bend the thin film part, and consequently moves the pin toward the valve element member side to change the position of the valve element member (see Patent Literature 1).

Meanwhile, in recent years, a large diameter fluid control valve that can pass a large amount of fluid per unit time and also has a large controllable flow rate range has been required. For this reason, it is necessary to make a movable stroke of the pin moved by the actuator larger than in conventional designs to make it possible to control an opening level between the valve seat member and a valve element member in a wider range.

For example, in the case of attempting to make a movable stroke of the valve element member larger without changing an output of the actuator from a conventional specification, it is possible to decrease rigidity in the thin film part to lower repulsiveness.

However, the diaphragm structure has been fabricated by machining such as cutting in the past, and therefore, for example, in the case of attempting to form the thin film part thinner than in conventional fluid control valves to achieve the lower repulsiveness, highly accurate cutting is required, thereby increasing manufacturing cost.

Also, even in the case of being able to cut and form the thin film part by machining down to a thinness thin enough to achieve the required low repulsiveness, a probability of giving rise to defects such as forming cavities in the thin film part is increased, increasing a probability of being unable to fulfill a function as the diaphragm structure, such as giving rise to a fault that causes fluid leakage. For this reason, to eliminate defective products, the presence or absence of a cavity should be strictly inspected by X-ray inspection or the like, and therefore quality control cost is also increased.

Due to the abovementioned problems, and from the perspectives of processing accuracy and various types of costs, it is very difficult to give lower repulsiveness to the diaphragm structure by conventional machining.

In addition, in the case of the conventional structure like welding the pin normally to the thin film part, distortion occurs in a welding part, and as a result of repetitive operation, fatigue fracture is highly likely to occur. That is, the conventional configuration itself also becomes a partial factor for preventing lowering repulsiveness of the diaphragm structure and increasing a diameter of the fluid control valve.

Further, in order to increase the stroke without increasing the output from the actuator even while forming the thin film part with the same thinness as is conventional, it is possible to increase an area of the thin film part to increase an area to be deformed, and thereby increase a bending deformation amount from a supported part to the pin. However, in the case of increasing the area of the thin film part, an area that receives, of pressure received from fluid present on a side where the pin is protruded, pressure in a direction normal to the thin film part, i.e., in a direction opposite to a moving direction of the pin, is increased, and therefore an amount by which force applied from the actuator is compensated is also significantly increased. For this reason, simply increasing the area of the thin film part may result in a reduction in stroke amount instead.

CITATION LIST

Patent Literature

Patent Literature 1: JP-A2001-27333

SUMMARY OF INVENTION

Technical Problem

The present invention is made in consideration of the problems as described above, and intended to provide a fluid control valve that is, in order to make it possible to increase a diameter and output thereof, provided with a diaphragm structure with low repulsiveness, can be largely deformed to increase a stroke even without being applied with a large force from an actuator, and is unlikely to give rise to a defect or fault even in the case of being formed thin.

Solution to Problem

That is, the fluid control valve of the present invention is a fluid control valve provided with a diaphragm structure, and an actuator that presses the diaphragm structure, wherein the diaphragm structure includes: a protruding part that is formed in a tubular shape and pressed by the actuator at least in an axial direction thereof; a brim part that spreads from a base end of the protruding part outward with respect to the protruding part; and a support part that is formed on an outer circumference of the brim part and attached to another member, and the brim part is formed in a film shape.

If so, pressure is mostly applied in a direction normal to a lateral circumferential surface of the protruding part, whereas force is applied by the actuator in the axial direction of the protruding part, so that the direction of the pressure and the direction of the force are substantially orthogonal to each other, and therefore the force by the actuator acts to deform the protruding part in the axial direction while being hardly compensated. Accordingly, the force applied by the actuator is hardly wasted, and therefore even with a small force, the protruding part can be largely deformed in the axial direction to ensure a large stroke. For this reason, the fluid control valve can be increased in size and output. That is, because the protruding part is formed in the tubular shape, and configured to be pressed in the axial direction thereof by the actuator, an area to be deformed can be increased, and pressure in a direction in which the force from the actuator is compensated can be prevented from being received, so that an amount of the stroke can be increased. Also a part where the brim part is connected to the base end of the protruding part causes displacement in the direction of the pressing by the actuator along with the deformation of the protruding part, and therefore the stroke amount can be further increased.

Further, in a central part and outer circumferential part of the brim part, the pressure applied to the brim part and the force applied to the brim part from the actuator are not orthogonal to each other but compensated, and therefore with these parts of the brim part being hardly deformed, only a part near the protruding part of the protruding and brim parts can be largely deformed. For example, most of the brim part is not largely moved by the force from the actuator, so that a separation distance for preventing the brim part from interfering with another member due to deformation in the fluid control valve can be made as small as possible, and the volume of the fluid control valve can be made as small as possible to improve responsiveness.

In order to make it possible to form the brim and protruding parts of the diaphragm structure very thin to give low repulsiveness, and obtain a larger stroke, it is only necessary that at least the brim part and the protruding part are formed of a thin metal plate by drawing. Also, if so, for the thin metal plate to be drawn, a rolled material can be used, and therefore even in the case of forming the brim part and the protruding part very thin, a cavity is hardly formed, and a defect is unlikely to be formed. Accordingly, even in the case of the thin formation, predetermined quality can be kept even without performing defect inspection by X-ray inspection, and as compared with the case of fabricating the brim and protruding parts having the same thinness by machining such as cutting, quality control cost can be suppressed from being increased.

In order to prevent the force applied to the protruding part by the actuator from being applied normally to a surface of the protruding part, and for example, apply the force along an inner circumferential surface to prevent the force from being concentrated on part of the protruding part to break the part, it is only necessary that the fluid control valve is further provided with an inner fitting member that is fitted to the inner circumferential surface of the protruding part without backlash and pressed by the actuator.

In order to form the diaphragm structure very thin, and even in the case where the protruding part is subjected to the force applied by the actuator, prevent the force applied by the actuator from being concentrated on one point to break the protruding part at an application point of the force, it is only necessary that the fluid control valve is further provided with a spherical body that is contained inside the protruding part, wherein the actuator is configured to press the protruding part in the axial direction of the protruding part through the spherical body.

In order to further increase an effect capable of applying the force from the actuator along a direction parallel to a lateral surface of the protruding part to prevent the protruding part from being easily broken by applying the force, which is applied to the protruding part by the actuator, normally to the lateral surface of the protruding part, it is only necessary that an inner fitting member that is fitted to an inner circumferential surface of the protruding part without backlash and pressed by the actuator is configured to retain the spherical body in the protruding part and be pressed by the actuator through the spherical body.

In specific configuration examples of a normal close type fluid control valve that can adjust an opening degree with the protruding part while preventing the actuator from coming into contact with fluid, the fluid control valve is further provided with: a valve seat member that is formed with a valve seat surface; and a valve element member that has a seating surface that is brought into contact with or separated from the valve seat surface, wherein a fore end part of the protruding part is configured to press the valve element member.

In order to make it possible to easily fix a position of the diaphragm structure in the fluid control valve and also press the valve seat member with the diaphragm structure to assemble the valve seat member, it is only necessary that the diaphragm structure is further provided with a flange part that has a higher rigidity than the support part and is welded to an outer circumferential part of the support part; and upon assembling, the flange part is assembled so as to press a protruded rim provided with a pressed surface formed on the valve seat member.

Advantageous Effects of Invention

As described, according to the fluid control valve of the present invention, in the protruding part, the direction of the pressure applied to the protruding part and the direction of the force from the actuator can be made substantially orthogonal to each other to prevent compensation, and therefore the force from the actuator can be efficiently used for the deformation of the protruding part. Accordingly, even with the actuator that does not provide output so largely, for example, the stroke amount that can be adjusted by the protruding part can be increased to realize the fluid control valve having a large diameter and large output.

REFERENCE CHARACTER LIST

100: Mass flow controller
V: Fluid control valve
3: Actuator
4: Diaphragm structure
41: Brim part
42: Protruding part
43: Flange part
44: Spherical body
45: Inner fitting member
5: Valve seat member
6: Valve element member

DESCRIPTION OF EMBODIMENTS

First Embodiment

A fluid control valve V and mass flow controller 100 according to a first embodiment of the present invention are described with reference to FIGS. 1 to 6.

Figure 1:
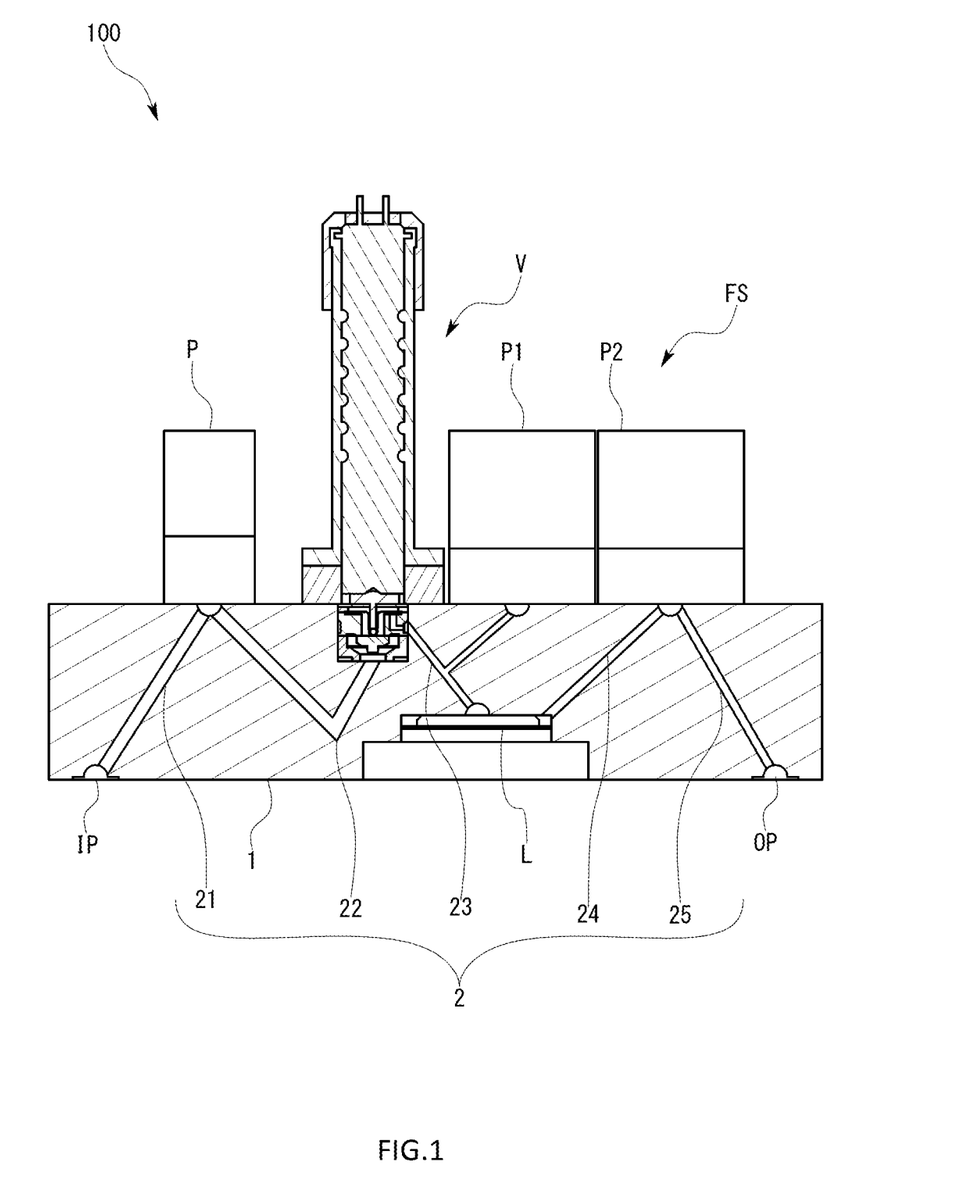
FIG. 1 is a mass flow controller provided with a fluid control valve according to a first embodiment of the present invention.

The mass flow controller 100 of the first embodiment is used in a semiconductor manufacturing apparatus, and as illustrated in FIG. 1, provided with: a body 1 that is formed inside with a flow path 2 through which fluid as a measuring target flows; a primary stage pressure sensor P for measuring pressure at the time when the fluid flowing through the flow path 2 flows into the body 1, or pressure on an upstream side before the fluid flows into the body 1; the fluid control valve V for controlling a flow rate of the fluid flowing through the flow path 2; a flow rate sensor FS for measuring the flow rate of the fluid flowing through the flow path 2; and a control part (not illustrated) that performs feedback control of an opening degree of the fluid control valve V so as to minimize a deviation between a target flow rate value and a measured flow rate value measured by the flow rate sensor FS.

Note that the primary stage pressure sensor P, the fluid control valve V, and the flow rate sensor FS are sequentially provided from upstream to downstream in this order. That is, the flow rate sensor FS is provided on a downstream side of the fluid control valve V.

The respective parts are described in detail.

The body 1 is formed in a blockish shape inside which the above-described flow path 2 penetrates, and an upstream end of the flow path 2 is connected to an external inflow pipe (not illustrated) as an inlet port IP, whereas a downstream end is connected to an external outflow pipe (not illustrated) as an outlet port OP. Also, the flow path 2 formed inside the body 1 is configured to include: a first flow path 21 that connects the inlet port IP and the primary stage pressure sensor P to each other; a second flow path 22 that connects the primary stage pressure sensor P and the fluid control valve V to each other; a third flow path 23 that connects the fluid control valve V and an after-mentioned laminar flow element L to each other; a fourth flow path 24 that connects the laminar flow element L and an after-mentioned second pressure sensor P2 to each other; and a fifth flow path 25 that makes a connection from the second pressure sensor P2 to the outlet port OP.

Note that in the following description, in particular, in the case of describing matters related to the fluid control valve V, the second flow path 22 and the third flow path 23 are also referred to as an upstream side flow path and a downstream side flow path, respectively.

The primary stage pressure sensor P is provided in order to measure an upstream side pressure change of the fluid flowing in from the external inflow pipe, and for example, the control part is configured to switch a control rule for the feedback control on the basis of a measured pressure value measured by the primary stage pressure sensor P.

Various types of flow rate sensors can be used as the flow rate sensor FS; however, the present embodiment employs a so-called pressure type flow rate sensor FS having good flow rate measurement accuracy and responsiveness. The pressure type flow rate sensor FS is one that sequentially includes, from upstream to downstream: a first pressure sensor P1 that measures pressure on the downstream side of the fluid control valve V; the laminar flow element L as a fluid resistor; and the second pressure sensor P2 that measures pressure on a downstream side of the laminar flow element L. The laminar flow element L generates a pressure difference between before and after the laminar flow element L, and the flow rate is measured on the basis of the respective pressures measured by the first and second pressure sensors P1 and P2.

Figure 2:
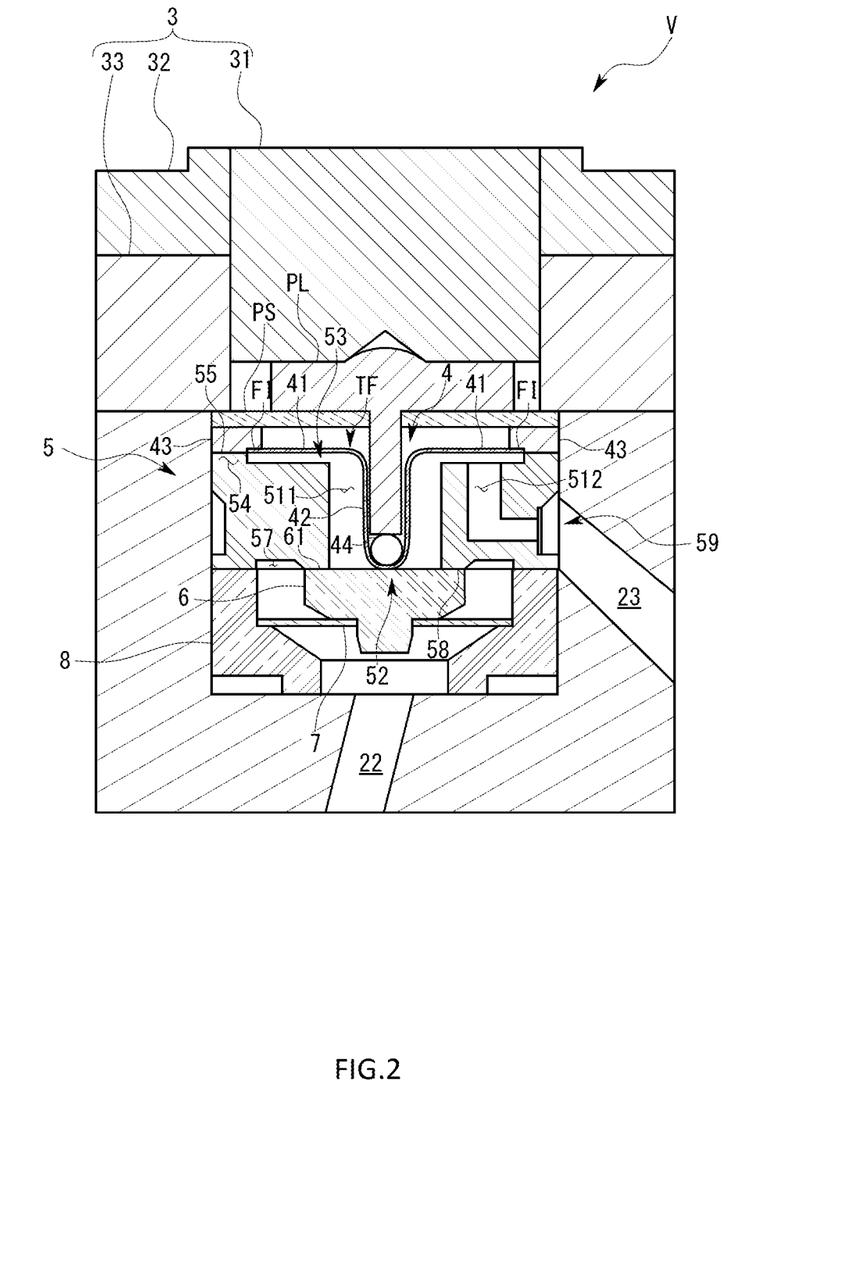
FIG. 2 is a schematic cross-sectional enlarged view illustrating the fluid control valve in the first embodiment.

The fluid control valve V is provided so as to make a connection between the second flow path 22 as the upstream side flow path and the third flow path 23 as the downstream side flow path, and controls the flow rate of the fluid that can pass on the basis of a separation distance between a valve seat member 5 and a valve element member 6. That is, the fluid control valve V is, as illustrated in FIGS. 1 and 2, sequentially from upstream to downstream, provided with an actuator 3, plunger PL, diaphragm structure 4, valve seat member 5, valve element member 6, leaf spring 7, and base member 8. More specifically, the separation distance between the valve seat member 5 and the valve element member 6 is adjusted by movement of the actuator 3, which is transferred to the valve element member 6 through the diaphragm structure 4. Also, the leaf spring 7 is formed with a plurality of slits for passing the fluid, and adapted to be of a normal close type that, in an initial state, presses up the valve element member 6 from the base member 8 toward the actuator 3 side to make the valve element member 6 and the valve seat member 5 keep in contact with each other.

The actuator 3 is provided with, for example, a piezo stack 31 formed by stacking a plurality of piezo elements. A casing member containing the piezo stack 31 is configured to include: an attachment part 33 that is attached to the body 1; and a cylindrical part 32 that contains the piezo stack 31. The cylindrical part 32 is formed of a member having a low thermal expansion coefficient, such as invar, and adapted to hardly give rise to thermal deformation. Accordingly, the cylindrical part 32 is hardly influenced by circumferential temperature, temperature of the fluid, or the like, and therefore regardless of temperature, a displacement amount depending on voltage applied to the piezo stack 31 can be obtained.

The plunger PL is attached to a fore end of the piezo stack 31, and formed in a substantially two-step cylindrical shape of which a central part protrudes downward. Also, the actuator 3 is configured to press the diaphragm structure 4 via the plunger PL. Further, an initial position restoring leaf spring PS is provided in a lower part in order to, in a state where voltage is not applied to the piezo stack 31, restore the piezo stack 31 and the plunger PL to initial positions, respectively.

Figure 3:
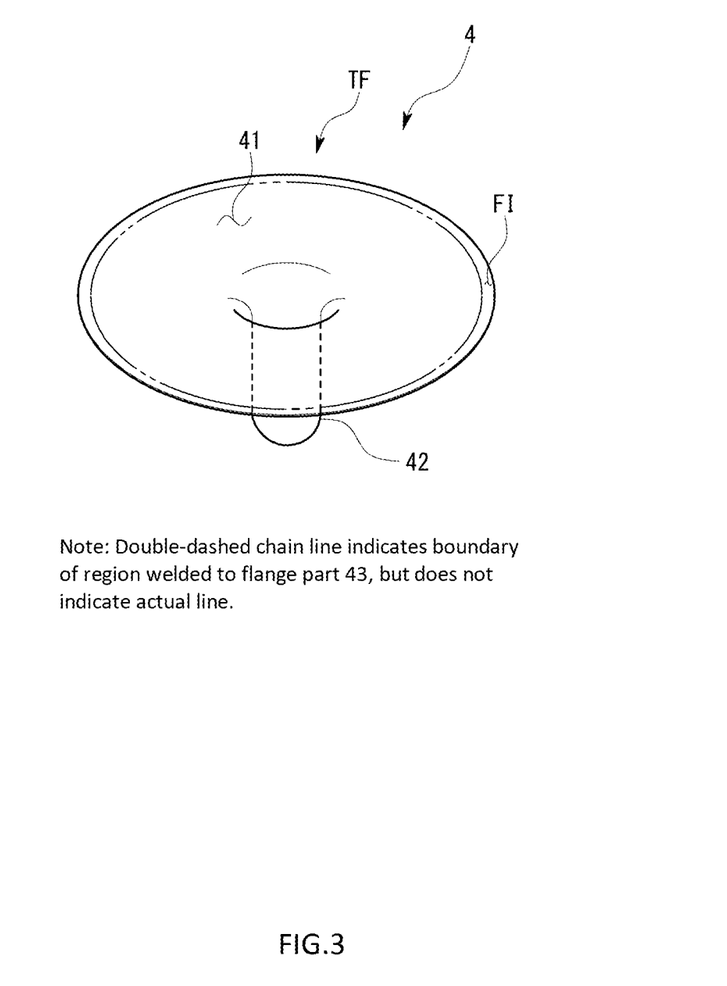
FIG. 3 is a schematic perspective view illustrating a film member of a diaphragm structure in the first embodiment.

The diaphragm structure 4, in the fluid control valve V, separates a flow path connecting the upstream side flow path and the downstream side flow path to each other and the outside where the actuator 3 is provided from each other, and also transfers pressing force from the actuator 3 arranged outside to the valve element member 6. The diaphragm structure 4 is, as illustrated in FIGS. 2 and 3, formed in a thin tubular shape of which a fore end is closed, and configured to include: a film member TF that includes a protruding part 42 that is pressed at least in its axial direction by the actuator 3, a brim part 41 that forms a gentle curved surface continuously from a base end of the protruding part 42 and spreads outward with respect to the protruding part 42, and a support part FI that forms a gentle flat surface continuously with an outer circumferential part of the brim part 41, is attached to another member, and is formed entirely in a thin film shape; and a substantially annularly shaped flange part 43 that is welded to the support part FI.

The film member TF is formed by drawing a rolled thin metal plate made of stainless steel or the like, and also formed to have a thickness of approximately 0.1 mm. Further, the brim part 41 and the support part FI correspond to parts of the thin metal plate which are sandwiched between a die and a blank holder, and the protruding part 42 corresponds to a part drawn by the die and a punch. Still further, the protruding part 42 protrudes vertically from the brim part 41, and is formed in a substantially thin tubular shape of which a fore end is closed. The present embodiment is adapted such that, on a bottom surface inside the protruding part 42, a spherical body 44 is contained, and a fore end of the plunger PL comes into contact with the spherical body 44 to transfer force from the actuator 3 to the valve element member 6. That is, in order to prevent part of the protruding part 42 from being broken by the plunger PL that directly presses an inner surface of the protruding part 42 to thereby concentrate force on one point, the present embodiment is configured to indirectly press the inner surface through the spherical body 44. In the present embodiment, the axial direction of the protruding part 42 and a pressing direction of the actuator 3 coincide with each other; however, the present invention may be adapted such that the directions are somewhat displaced, and for example, the actuator 3 presses the spherical body 44 obliquely to the axial direction of the protruding part 42. That is, "pressing at least in its axial direction" is a concept including pressing in a state where an axial direction component of the protruding part 42 is included in the pressing force of the actuator 3.

Figure 4A:
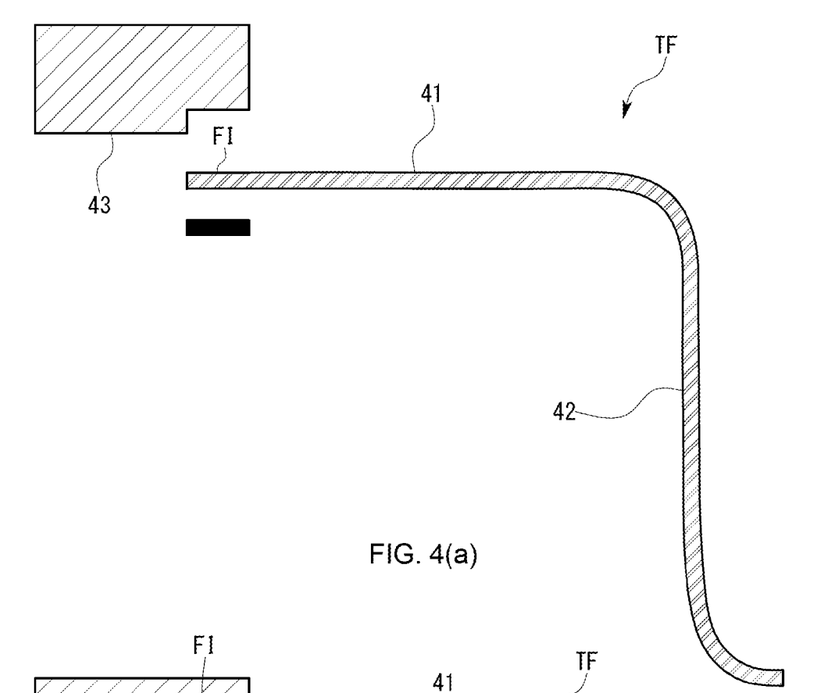
FIGS. 4(a) and 4(b) are schematic diagrams illustrating a method for welding the film member and a flange part together in the first embodiment.
Figure 4B:
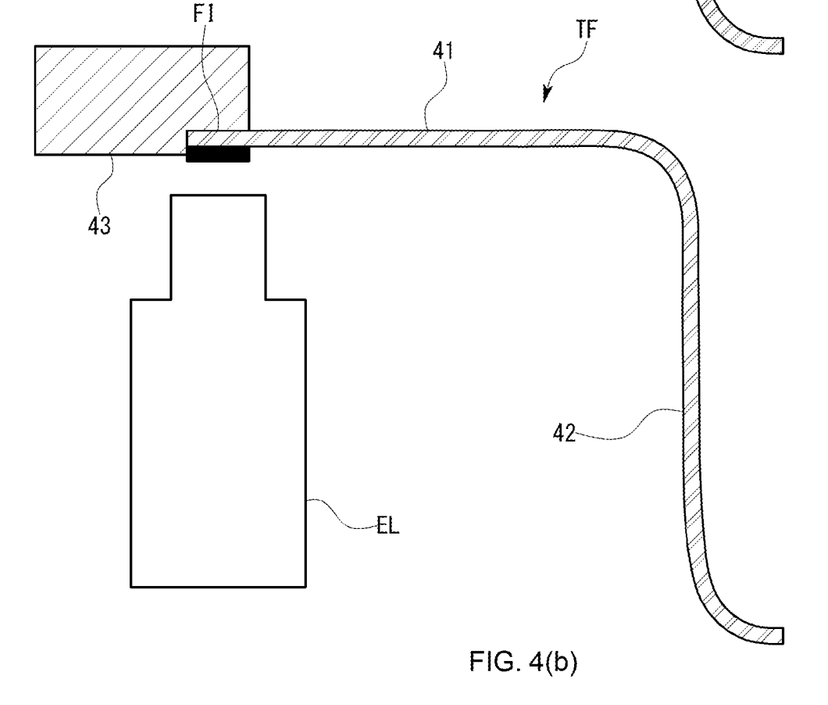

The brim part 41 is formed in a substantially thin disk shape as viewed from above, and as illustrated in FIG. 4, the support part FI formed on an outer circumference of the brim part 41 is, with use of an electrode EL, resistance-welded to the thin annular-shaped flange part 43 having a larger thickness than those of the brim part 41 and support part FI and high rigidity. Further, as illustrated in FIG. 2, a flat surface excluding the support part FI welded to the flange part 43 is assembled so as to, at the time of assembling, press an after-mentioned protruded rim 54 provided with a pressed surface 55 formed on the valve seat member 5. This is intended to prevent a welded part formed as an uneven surface between the support part FI and the flange part 43 from coming into contact with the pressed surface, and press the valve seat member 5 downward with surface contact-based uniform force to keep surface accuracy of the valve seat surface 58.

The valve seat member 5 is, as illustrated in FIG. 2, formed in a substantially two-step cylindrical shape of which a bottom surface part 52 is formed with the valve seat surface 58 coming into contact with a seating surface 61 of the valve element member 6, and bottom and upper surface sides respectively have small and large diameters, and in the central part, a first in-valve flow path 511 extending in an axial direction is formed, whereas a substantially L-shaped second in-valve flow path 512 is formed in a cross section communicatively connecting from an upper surface to a lateral surface. Also, in an upper surface part 53 of the valve seat member 5, the protruded rim 54 that is protruded upward so as to surround the outside of openings of the first and second in-valve flow paths 511 and 512 is formed. An upper surface of the protruded rim 54 is formed as a flat surface, and serves as the pressed surface 55 that is, at the time of assembling, pressed by the flange part 43.

In the bottom surface part 52, the valve seat surface 58 is formed so as to surround an inflow opening of the first in-valve flow path 511 in the bottom surface part 52, and also outside the bottom surface part 52, an annularly shaped concave groove 57 having an outside diameter smaller than that of the protruded rim 54 is formed so as to surround the inflow opening. The presence of the concave groove 57 enables flatness of the valve seat surface 58 to be kept even in the case where the pressed surface 55 is pressed at the time of assembling, because deformation on the bottom surface part 52 side of the valve seat member 55 is limited to deformation only on a substantially outer circumferential side. Accordingly, a preferable degree of contact with the seating surface 61 of the valve element member 6 can be constantly kept to fulfill a sealing function as a valve.

Further, the valve seat member 5 is assembled to be fitted into a columnar concave part provided in the body 1. The concave part is arranged so as to separate the second and third flow paths 22 and 23 in the body 1 from each other, and the second flow path 22 as the upstream side flow path is adapted to be opened in a bottom surface central part of the concave part, whereas the third flow path 23 as the downstream side flow path is adapted to be opened in a position that is in a central part of an outer circumferential surface 59 of the concave part and corresponds to a small diameter part of the valve seat member 5.

Further, the present embodiment is adapted such that, in a state where the valve seat member 5 is fitted into the concave part, the upper surface part 53 side of the valve seat member is fitted to an inner circumferential surface of the concave part substantially without any gap, whereas between the small diameter part on the bottom surface part 52 side of the valve seat member 5 and the inner circumferential surface of the concave part, a gap is formed.

To describe a flow of the fluid in the valve seat member 5 having such a configuration, the fluid flows in from the inflow opening formed in the bottom surface part 52 to arrive at the upper surface part 53 through the first in-valve flow path 511, and then passes through the second in-valve flow path 512 to flow from an outer circumferential surface of the valve seat member 5 to the downstream side flow path.

The present embodiment is configured such that an upper surface of the valve element member 6 is formed as the seating surface 61, and in a state where a lower surface side of the valve element member 6 is elastically supported by the leaf spring 7 and not pressed by the actuator 3, the valve seat surface 58 of the valve seat member 5 and the seating surface 61 are in surface contact with each other to prevent the fluid from flowing into the valve seat member 5. Also, the present embodiment is adapted to be able to control the flow rate of the passing fluid in such a way that as a result of applying voltage to the actuator 3, an upper surface central part of the valve element member 6 is pressed by a fore end of the protruding part 42 and thereby moves downward, and consequently the opening level of the fluid control valve V is changed.

Figure 5:
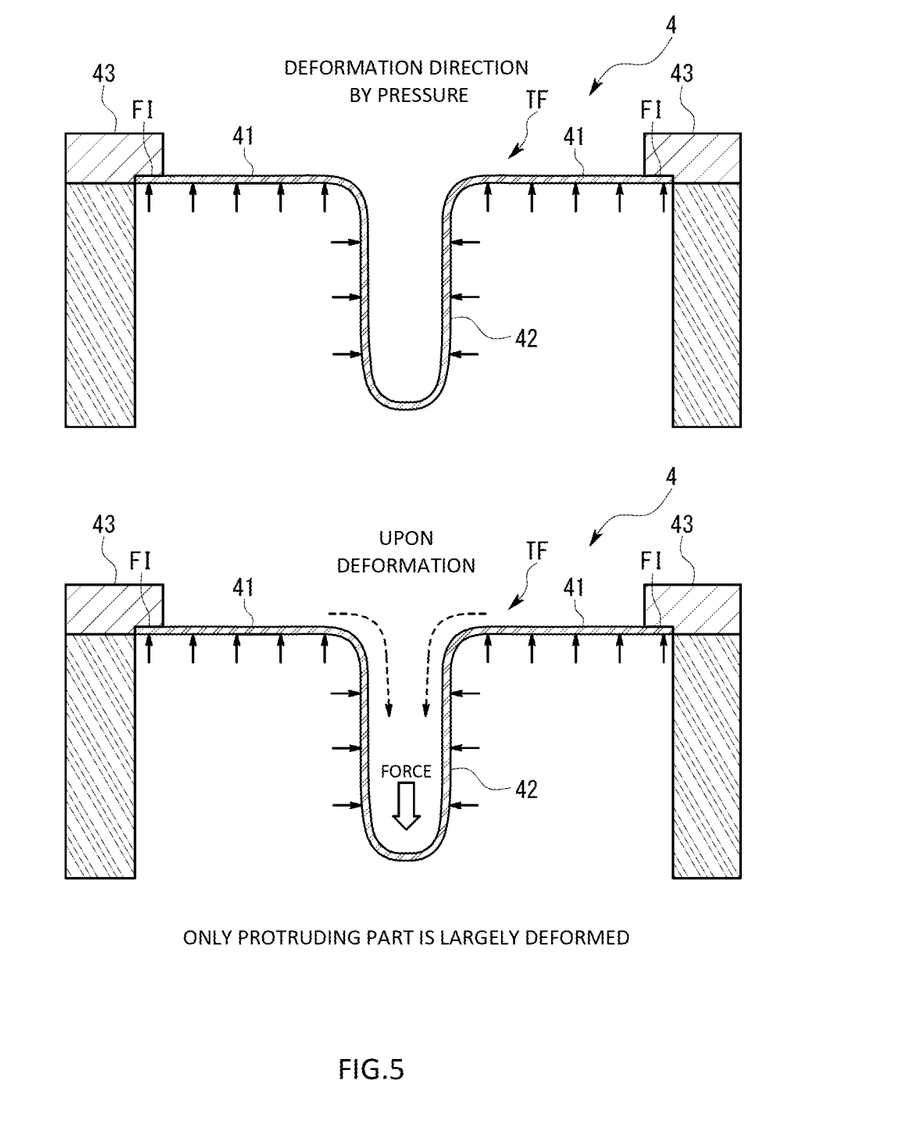
FIG. 5 is a schematic diagram illustrating a deformation mode of the diaphragm structure upon pressing in the first embodiment.

Next, a deformation mode of the diaphragm structure 4 at the time when the diaphragm structure 4 is pressed by the actuator 3 is described while compared with a conventional example. FIG. 5 illustrates the deformation mode of the diaphragm structure 4 of the present embodiment, and FIG. 6 illustrates a deformation mode of a conventional diaphragm structure 4A.

As illustrated in FIG. 5, it turns out that in the diaphragm structure 4 of the present embodiment, the direction of the pressing force by the actuator 3 and a direction of pressure applied to the protruding part 42 from the flow path have a orthogonal relationship with each other. Accordingly, in the case where the protruding part 42 is pressed downward by the actuator 3, the pressing force is applied to the protruding part 42 without being compensated. Also, the film member TF is formed of the thin metal film by drawing, so that a thickness thereof can be made very thin as compared with a conventional one, and also rigidity of the film member TF itself is low. From this, even without being subjected to a large force applied by the actuator, only the protruding part 42 can be largely deformed. From this, in the diaphragm structure 4, a surface area of a part where pressure in a direction opposite to the pressing direction of the actuator 3 is applied by the fluid is decreased, and concurrently an amount of a deformable member in the diaphragm structure 4 is increased, so that a stroke in the axial direction of the protruding part 42 can be increased even in the case where the pressing force from the actuator 3 is unchanged as compared with a conventional case. Also, between the base end of the protruding part 42 and the brim part 41, the continuous and gentle curved surface is formed by drawing, so that this part also causes deformation to cause displacement in the axial direction of the protruding part 42, and consequently an amount of the stroke can be increased. Further, the support part FI is securely fixed to the flange part 43 by welding, and therefore using the welded part as a supporting point to enable the protruding part 42 and the brim part 41 near the protruding part 42 to be largely deformed also contributes to the increase of the stroke amount.

Figure 6:
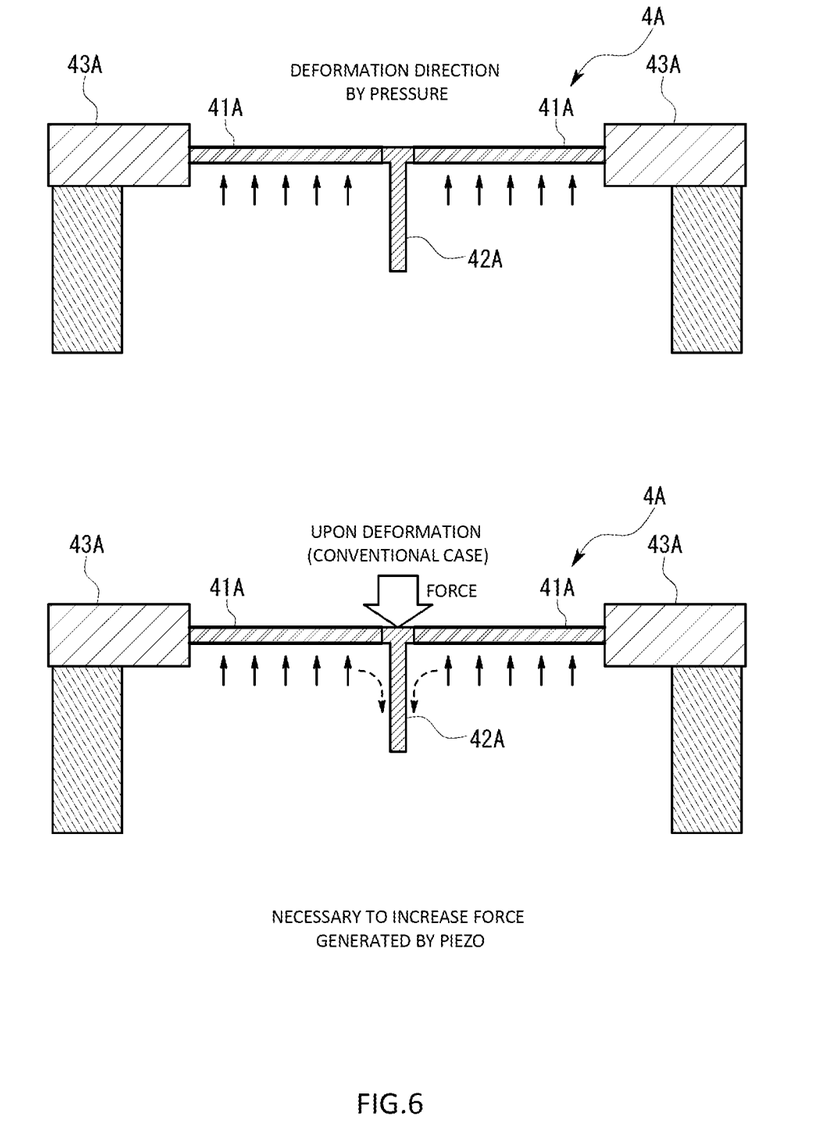
FIG. 6 is a schematic diagram illustrating a deformation mode of a diaphragm structure upon pressing in a conventional example.

On the other hand, the conventional example illustrated in FIG. 6 is the diaphragm structure 4A in which a thin film part 41A is formed by machining such as cutting and therefore a thickness of the thin film part 41A is approximately 0.2 mm, and also in a central part of the thin film part 41A, a solid pin 42A corresponding to the protruding part 42 of the present embodiment is provided. That is, as compared with the present embodiment, the conventional diaphragm structure 4A is a highly rigid structure. Also, in the case of such a diaphragm structure 4A, when an upper part of the pin 42A is pressed by an actuator, the pin 42A itself is not deformed in a pressing direction, and the thin film part 41A is bent and deformed to thereby press the pin downward. That is, pressure applied to the thin film part 41A and force pressing the thin film part 41A are opposite in direction and compensated, so that the force is used not for deformation in a pressing direction but for the bending deformation of the thin film part 41A, and therefore a downward displacement amount is not so large with respect to the inputted force.

As can be seen from FIGS. 5 and 6, the present embodiment is configured such that rigidity of the diaphragm structure 4 can be made low as compared with the conventional one and thereby given low repulsiveness, and also the protruding part 42 itself pressing the valve element member 6 is deformed toward the valve element member 6 side, and can therefore obtain a large downward displacement amount even with small force. That is, in the examples of FIGS. 5 and 6, in the case of using actuators having the same output, the diaphragm structure 4 of the present embodiment can ensure a larger stroke, and therefore the fluid control valve V can be configured to have a larger diameter and larger output.

Also, the thin film part 41A of the conventional diaphragm structure 4A as illustrated in FIG. 6 is formed by machining, which may give rise to defects such as forming cavities, and therefore it is necessary to perform quality control by X-ray inspection; however, the film member TF of the diaphragm structure 4 of the present embodiment is formed by drawing, which does not give rise to any defect such as a cavity formed by machining, and therefore an inspection step can be omitted. From this, even in the case of forming the diaphragm structure 4 thinner than is conventional, cost necessary for quality control can be reduced.

In addition, in the brim part 41, the pressure applied to the brim part 41 and the force applied to the brim part 41 from the actuator are opposite in direction, and therefore only the protruding part 42 inserted into the first in-valve flow path 511 of the valve seat member 5 can be largely deformed with the brim part 41 being hardly deformed. Accordingly, even in the case of making a gap between the brim part 41 and the upper surface part 53 small, the brim part 41 does not interfere with the upper surface part 53 at the time of pressing by the actuator 3, and the volume of the flow path inside the fluid control valve V can be made as small as possible to increase responsiveness of fluid control. Also, by forming the brim part 41 as described, a contact area with fluid in the diaphragm structure 4 can be decreased to easily prevent the fluid from leaking outside through the diaphragm structure 4.

Figure 7:
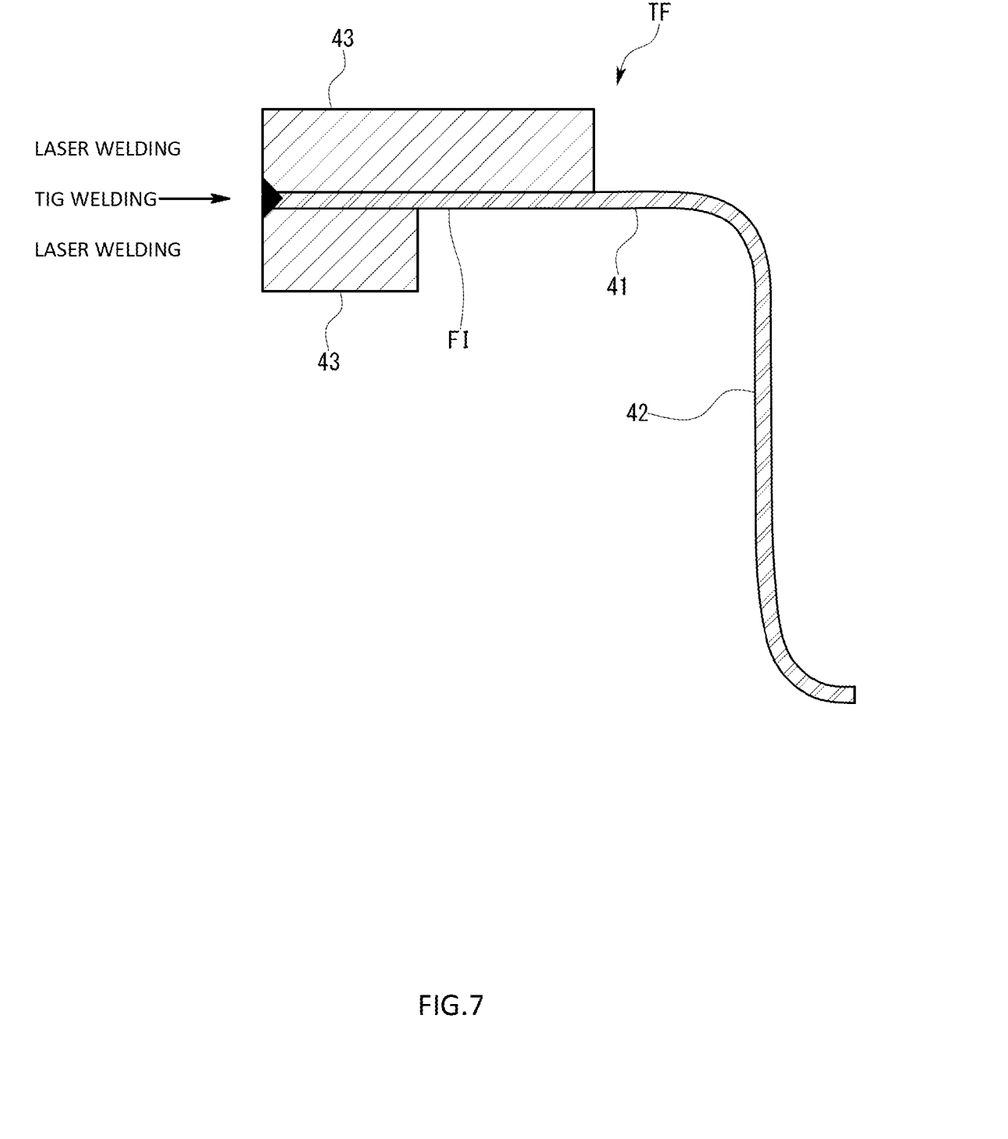
FIG. 7 is a schematic diagram illustrating a method for welding the film member and a flange part together in a variation of the first embodiment.

A variation of the first embodiment is described. In the first embodiment, the thin plate annularly shaped support part FI formed on the outer circumferential part of the brim part 41 is connected to the thin plate annularly shaped flange part 43 by welding the support part FI to the flange part 43; however, as illustrated in FIG. 7, the present invention may make the connection in such a way as to sandwich an outer circumferential part of the support part FI between face plate parts of two flange parts 43 that are annularly thin plates, and perform TIG welding of outer circumferential parts of the support part FI and flange parts 43.

Second Embodiment

Next, a second embodiment is described with reference to FIGS. 8 and 9. Note that members corresponding to those in the first embodiment are denoted by the same letters or numerals.

A fluid control valve V of the second embodiment is, as compared with the first embodiment, different in structure for, in a diaphragm structure 4, retaining a spherical body 44 to which force from an actuator 3 is transferred.

Figure 8:
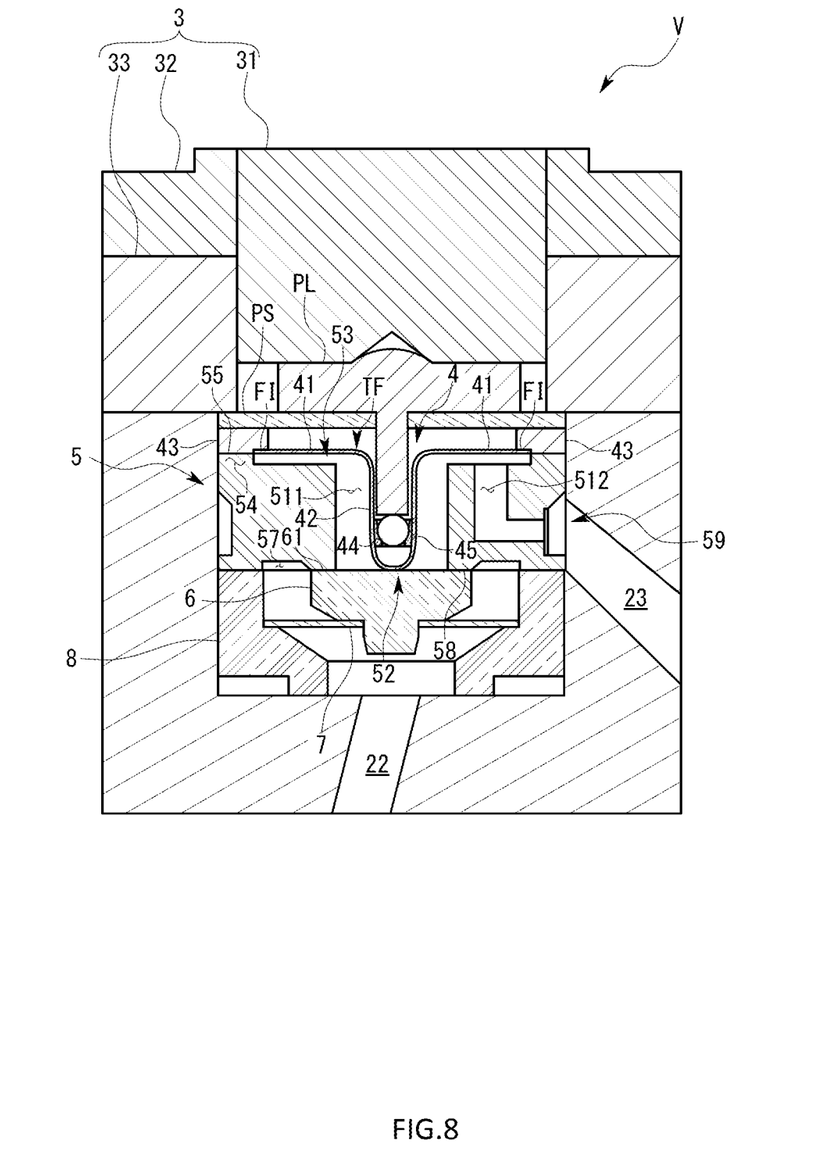
FIG. 8 is a schematic diagram illustrating a fluid control valve according to a second embodiment of the present invention.
Figure 9:
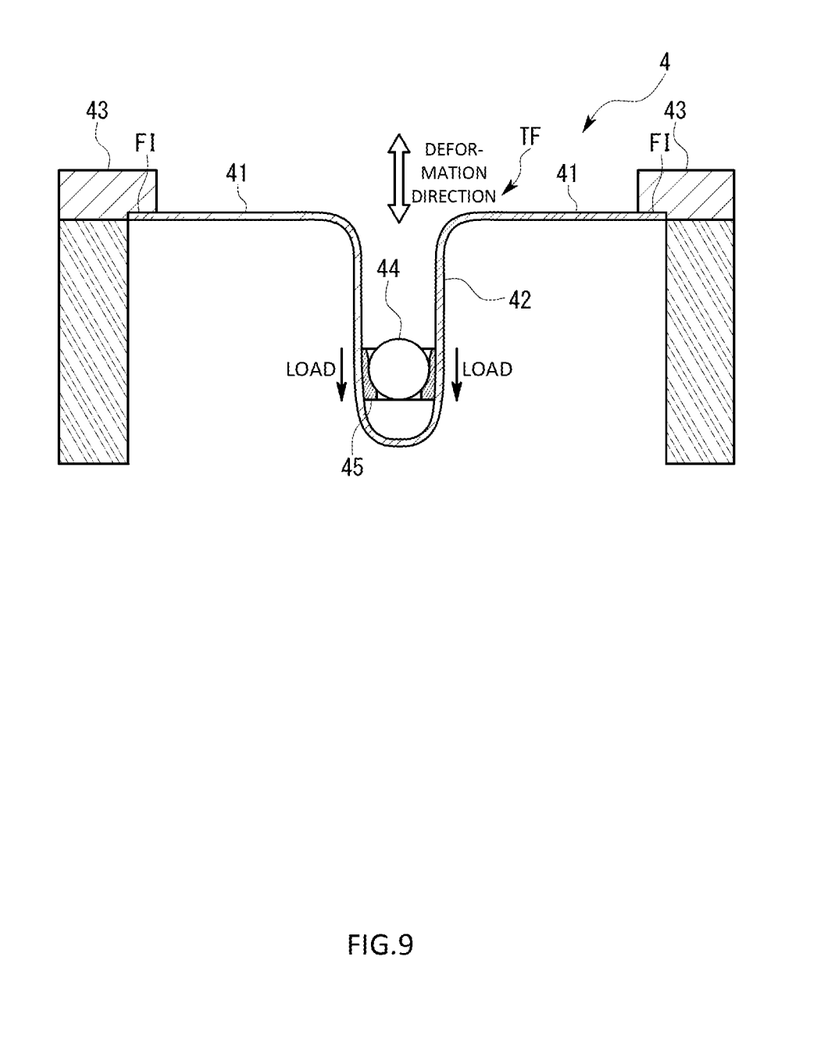
FIG. 9 is a schematic diagram illustrating a direction of force applied to a diaphragm structure upon pressing in the second embodiment.

More specifically, the diaphragm structure 4 of the second embodiment is, as illustrated in FIGS. 8 and 9, provided with an inner circumferential surface of a protruding part 42, to which an inner fitting member 45 that retains the spherical body 44 is fitted without backlash.

The inner fitting member 45 is a substantially hollow cylinder configured to have a thickness that is increased from an upper side toward a lower side, and configured to have substantially the same outside diameter as an inside diameter of the protruding part 42. Inside the inner fitting member 45, the spherical body 44 coming into contact with a fore end of a plunger PL is contained.

As illustrated in FIG. 9, in the case where voltage is applied to the actuator 3, and the plunger PL presses the spherical body 44 contained in the inner fitting member 45 downward, the force from the plunger PL is applied downward in parallel with the inner circumferential surface of the protruding part 42 through an outer circumferential surface of the inner fitting member 45. That is, in the first embodiment, the spherical body 44 is placed on the bottom surface of the protruding part 42, and therefore in the case where the force is applied by the actuator 3, the force is applied in the direction normal to the inner bottom surface of the protruding part 42, whereas in the second embodiment, the force is applied in parallel with the inner circumferential surface of the protruding part 42 through the inner fitting member 45. For this reason, in the second embodiment, in the case of deforming the protruding part 42 toward a valve element member 6 side, force normal to the surface is not applied, and even in the case where large force is applied, it is possible to make breakage more unlikely.

Accordingly, critical strength of the diaphragm structure 4 can be increased, so that a range of the force applied from the actuator 3 can be made wider to ensure a larger stroke of the diaphragm structure 4, which consequently makes it possible to provide a configuration as the fluid control valve V having a larger diameter and larger output.

Other embodiments are described.

Figure 10A:
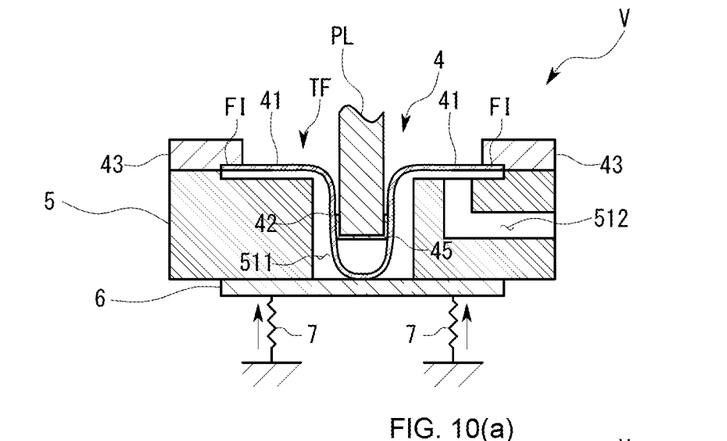
FIGS. 10(a) and 10(b) are schematic diagrams respectively illustrating fluid control valves in other embodiments.
Figure 10B:
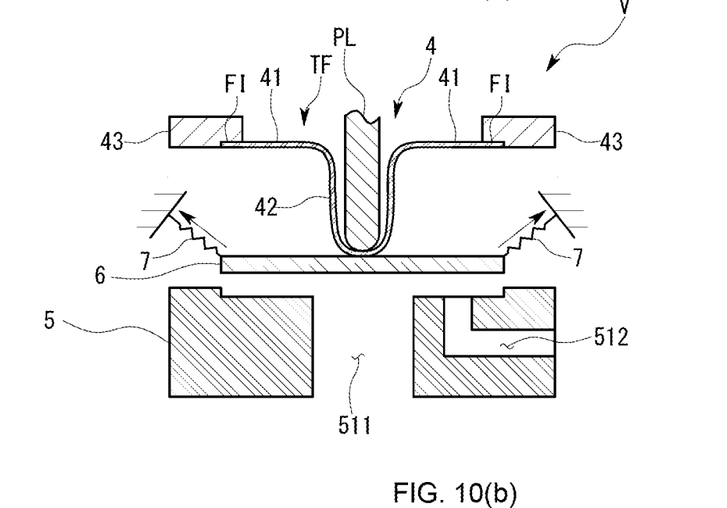

The present invention may be adapted to provide a diaphragm structure 4 constituting a normal close type fluid control valve V illustrated in FIG. 10(a) with an inner fitting member 45 fitted inside a protruding part 42 without backlash, and also directly press the inner fitting member 45 with a fore end of a plunger PL. Also, as illustrated in FIG. 10(b), a diaphragm structure 4 of the present invention can be used not only to constitute the normal close type but also to constitute a normal open type fluid control valve V. Further, as illustrated in FIG. 10(b), the present invention may be configured to press the inside of a protruding part 42 with a fore end of a plunger PL.

Figure 11A:
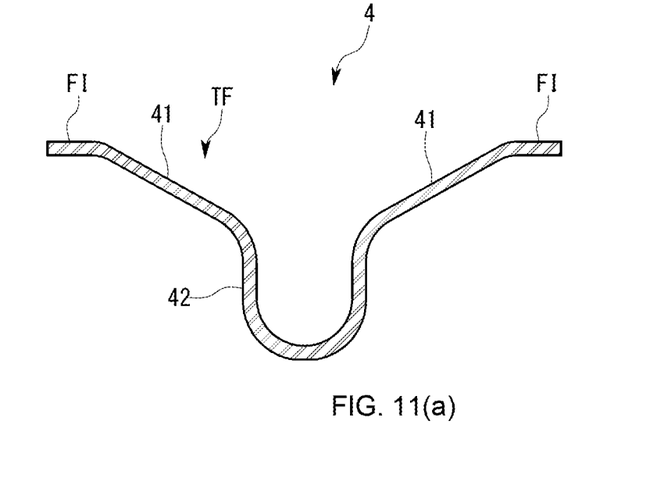
FIGS. 11(a) and 11(b) are schematic diagrams illustrating a configuration of a film member in still another embodiment.
Figure 11B:
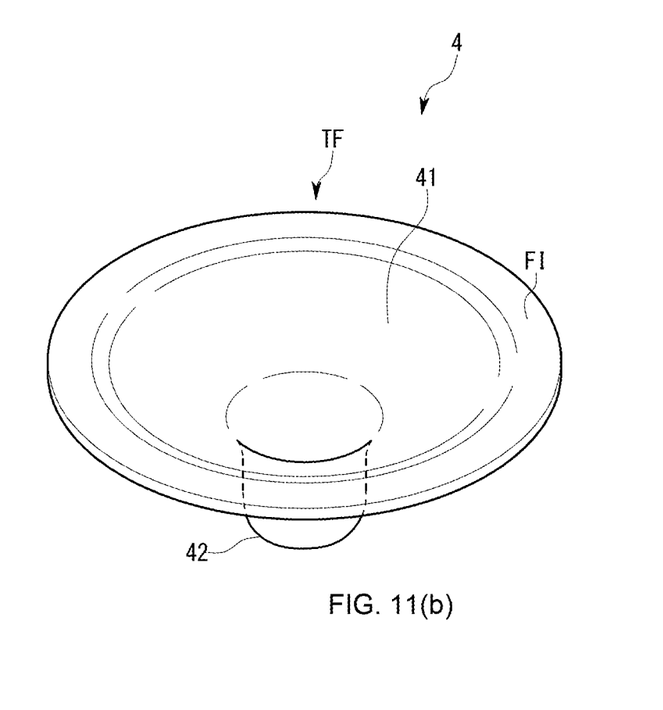

Further, as described in each of the above-described embodiments, the brim part 41 is not only formed so as to spread along a plane normal to the axial direction of the protruding part 42, but may be formed so as to, as illustrated in FIG. 11, form a slanted surface. In other words, if the film member TF shown vertically in a cross-section along the axis of the protruding part 42, in each of the above-described embodiments, the film member TF is formed in a substantially T shape; however, even in the case where the film member TF is vertically cross-sectionally Y-shaped as illustrated in FIG. 11(a) and formed in a substantially funnel shape as illustrated in FIG. 11(b), effects as described in the respective embodiments above can be obtained. That is, a formation angle of the brim part 41 with respect to the protruding part 42 may be any angle. To form the film member TF having the shape as illustrated in FIG. 11, it is only necessary to form the film member TF by, for example, two-step drawing of a thin metal plate. Also, the protruding part may be one of which one end is not closed but opened.

In each of the above-described embodiments, the diaphragm structure is formed by drawing a thin aluminum plate; however, the diaphragm structure may be formed of another thin metal plate. Also, the protruding part formed in each of the above-described embodiment is formed by deep drawing so as to make a depth larger than an inside diameter; however, depending on an intended use or size, the protruding part may be formed by shallow drawing so as to make the inside diameter larger than the depth. The actuator is not limited to the piezo but may use, for example, a solenoid or the like. Also, in each of the above-described embodiments, the diaphragm structure is used to constitute the normal close type fluid control valve; however, the diaphragm structure may be used to constitute a normal open type fluid control valve.

In each of the above-described embodiments, the mass flow controller provided with the pressure type flow rate sensor on the downstream side of the fluid control valve is described; however, even in the case where the flow rate sensor is a thermal type flow rate sensor, the effects of the present invention can be obtained.

In each of the above-described embodiments, the fluid control valve is used to control the flow rate of the fluid; however, it may be used as a pressure control valve for controlling pressure of the fluid. As the fluid to be controlled, any of liquid and gas is possible.

Besides, unless contrary to the scope of the present invention, various modifications and combinations of the embodiments may be made.

INDUSTRIAL APPLICABILITY

According to the present invention, a fluid control valve having a low defect occurrence probability, sufficiently reduced processing cost and inspection cost, and a large diameter and large output can be provided.

The invention claimed is:

1. A fluid control valve comprising a diaphragm structure, and an actuator that presses the diaphragm structure, wherein the diaphragm structure comprises:
   a protruding part that is formed in a tubular shape with a closed fore end and pressed by the actuator at least in an axial direction thereof;
   a brim part that spreads from a base end of the protruding part outward with respect to the protruding part;
   a support part that is formed on an outer circumference of the brim part and attached to another member;
   a valve seat member that is formed with a valve seat surface; and
   a valve element member that has a seating surface that is brought into contact with or separated from the valve seat surface, wherein
   the fore end of the protruding part is configured to press the valve element member,
   the brim part is formed as a film in a flat or slanted annular disk shape,
   the base end of the protruding part is formed as a curved shape, and
   the diaphragm structure has a uniform thickness.

2. The fluid control valve according to claim 1, wherein at least the brim part and the protruding part are formed of a thin metal plate by drawing.

3. The fluid control valve according to claim 1, further comprising
   an inner fitting member that is fitted to an inner circumferential surface of the protruding part without backlash and pressed by the actuator.

4. The fluid control valve according to claim 1, further comprising
   a spherical body that is contained inside the protruding part, wherein
   the actuator is configured to press the protruding part in the axial direction of the protruding part through the spherical body.

5. The fluid control valve according to claim 4, wherein an inner fitting member that is fitted to an inner circumferential surface of the protruding part without backlash and pressed by the actuator is configured to retain the spherical body in the protruding part and be pressed by the actuator through the spherical body.

6. The fluid control valve according to claim 1, wherein:
the diaphragm structure further comprises a flange part that has higher rigidity than the support part and is welded with the support part; and
upon assembling, the flange part is assembled so as to press a protruded rim provided with a pressed surface formed on the valve seat member.

7. The fluid control valve according to claim 1, wherein:
a radial width dimension of the brim part is larger than a diameter of the protruding part.

* * * * *